United States Patent

Stancell et al.

[15] 3,657,113

[45] Apr. 18, 1972

[54] SEPARATING FLUIDS WITH SELECTIVE MEMBRANES

[72] Inventors: Arnold F. Stancell, Highland Park; Arthur T. Spencer, Providence, both of N.J.

[73] Assignee: Mobile Oil Corporation

[22] Filed: Feb. 3, 1970

[21] Appl. No.: 8,411

[52] U.S. Cl. .................................210/23, 55/16, 210/321, 210/490, 210/506
[51] Int. Cl. .........................................................B01d 13/00
[58] Field of Search ..................55/16, 58; 210/22, 23, 321, 210/500, 490, 491, 507, 508, 509

[56] References Cited

UNITED STATES PATENTS 3,228,876   1/1966   Mahon.....................................210/22

FOREIGN PATENTS OR APPLICATIONS 727,436   2/1966   Canada.....................................55/16

OTHER PUBLICATIONS

1968, Saline Water Conversion Report, 489 pages, published 6/5/69 by Sup't. of Documents.

Primary Examiner—Frank A. Spear, Jr.
Attorney—Oswald G. Hayes, Andrew L. Gaboriault and James F. Snowden

[57] ABSTRACT

Gaseous or liquid components are concentrated or separated from others differing in molecular size or shape and/or solubility characteristics in homogeneous multicomponent mixtures (e.g., concentrating hydrogen in a hydrogen-methane mixture) by permeation through an ultrathin cross-linked plasma-discharge polymerizate layer of high permselectivity and controlled thickness supported on or bonded to a face of a fluid-permeable substrate. Membranes are prepared by ionizing and polymerizing vaporized monomeric organic compounds (e.g., benzonitrile) at low subatmospheric pressures by a plasma glow discharge which deposits and bonds unbroken cross-linked coatings of about 0.1 to 0.5 micron total thickness onto thicker preformed substrates (e.g., films of polymeric siloxanes or polyphenylene oxide) of adequate strength.

17 Claims, No Drawings

SEPARATING FLUIDS WITH SELECTIVE MEMBRANES

BACKGROUND OF THE INVENTION

1. Field of the Invention

The present invention is concerned with concentrating, segregating or separating fluid (i.e., gaseous or liquid) components of homogeneous mixtures by permeation or diffusion of part of the fluid mixture through a permselective or semipermeable membrane.

2. Prior Art

Practically all nonporous solid membranes or films of homogeneous resins appear to be permeable to at least some gases, vapors or liquids. Some polymer membranes are known to exhibit varying degrees of selectivity for the passage therethrough of molecules of different substances, but there had been little or no practical application of selective permeation through such resin films. The separation, concentration or purification of fluid substances are relatively few by reason of a number of limiting factors, such as low throughputs of the desired permeant through relatively selective membranes and poor selectivity in relatively permeable membranes.

Many proposals have been made for improving the permselectivity of various polymeric membranes without sacrificing throughput, and these efforts have included orientation, solvent, heat and radiation treatments of the film as well as forming pores therein of controlled size. For instance, composite membranes have been formed by repeated monolayer deposition to form a coating composed of a mixture of stearic acid and stearate soaps onto permeable substrates as described by G. D. Rose et al in Science, 159, 636–7 (1968) and also by radiation grafting onto permeable substrates as mentioned by S. Munari et al. in J. Apl. Polymer Sci., II, 1563–70 (1967) in respect to the grafting of styrene onto polytetrafluoroethylene film by a preliminary activation of the film by irradiation with ultraviolet followed by exposure of the treated film to styrene and chlorosulfonation.

H. J. Bixler et al. in J. Polymer Sci., 1, 895–919 (b 1963) described the treatment of polyethylene film with gamma radiation as producing cross-linking of the polymer and increasing solubility constants; and W. L. Robb in a publication entitled "Thin Silicone Membranes — Their Permeation Properties and Some Applications," Gen. Elec. Co. Technical Information Series No. 65–C–031 (1965) indicated that the X-ray treatment of permeable silicone rubbers resulted in cross-linking and produced fairly brittle films in some cases, yet the permeability and selectivity were only altered slightly. When such X-ray and gamma radiation are employed, it is thought that the resulting cross-linking extends throughout the entire body or thickness of the film rather than being confined to the surface thereof.

British Pat. No. 920,860 is concerned with improving the surface characteristics of various polymeric films, e.g., polyfluorocarbon films, especially in regard to bonding and dyeing properties by depositing a polymeric coating thereon by means of a spark generator discharge in a monomer vapor at apparently atmospheric pressure. However, there is reason to believe that the resulting deposits are of a spotty or discontinuous nature rather than unbroken coatings; moreover the discharge evidently does not produce a substantially cross linked coating, and the surface modification appears to be of a temporary nature, for the coating is indicated to be removable by boiling methyl ethyl ketone unless the film is subjected to a subsequent baking treatment at temperatures of the order of 200° C. Among the large number of uses proposed for such treated films is employment as diffusion separators for unspecified purposes and without indication of any enhanced performance in such applications.

In summation, the aforesaid methods of treating films or permeable membranes have achieved only slight or modest improvement in membrane performance and there appear to be no commercial permselective applications other than the pilot testing on a large scale of desalination membranes prepared by subjecting cellulose acetate films to solvent and heat treatment to produce a tight outer skin on the highly permeable substrate.

The use of the plasma glow discharge technique for depositing cross-linked coatings onto a variety of substrates from various gaseous monomers is known, and some methods are described in Coleman U. s. Pat. Nos. 3,068,510 and 3,069,283 which are chiefly concerned with manufacturing capacitor materials, etc. U.S. Pat. No. 3,068,510 also discloses depositing a glow-discharge polymerizate, cross-linked styrene, onto a polystyrene or polyethylene supporting substrate which is then dissolved in toluene in producing an unsupported, single layer, ultrathin, cross-linked polymeric film.

It has now been discovered that strikingly improved selectivity in separating or segregating fluid components of homogeneous mixtures can be obtained by utilizing an ultrathin, highly cross-linked polymerizate membrane formed by means of a luminescent plasma discharge in a monomer atmosphere at a low subatmospheric pressure. In view of the limited strength of the very thin polymeric sheet material, it is supported on a permeable substrate to withstand the pressure differentials involved in permeation processes. The high degree of cross-linking in such polymerizates enhances small differences in the diffusivity of fluid substances having molecules of closely similar size and shape. Also it is likely that varying the composition of the polymerizate precursors alters permeability of the membrane to different molecules through solubility effects. Even though the cross-linked polymerizate layer is unbroken or continuous over its entire operating surface, its extremely small thickness (usually submicron) minimizes any sacrifice in throughput of the chief permeant gas or liquid.

SUMMARY OF THE INVENTION

Accordingly, the present invention is concerned with a process for at least partially separating fluid components from fluid mixtures by selective permeation through a permeable membrane at a substantially higher flow rate than another component of said mixtures; and the invention particularly relates to the improvement in said process which comprises employing a permselective device comprising a substrate having at least substantial permeability for said fluid substance and providing supporting contact on at least one substantial surface area of said substrate for an uninterrupted ultrathin layer of a cross-linked plasma-discharge polymerizate of substantially higher selectivity for said permeation than said substrate.

Narrower aspects of the invention relate to the combination in said process of one or more of such features as specific conditions for preparing the membranes, especially composite laminar membranes, including specified subatmospheric pressure, vaporization characteristics of coating precursors and plasma deposition of coatings from more than one precursor monomer; preferred thicknesses of the membrane layers; multiple permeation steps and the separation of miscible liquids and of gaseous mixtures, particularly the separation of hydrogen from mixtures containing methane and other gaseous organic compounds.

DESCRIPTION OF SPECIFIC EMBODIMENTS

Although the present invention is described in detail hereinafter chiefly in connection with hydrogen and methane as a model system that is well adapted for comparing the efficiency and selectivity of a wide variety of composite membranes suitable for use in the instant process, it is to be emphasized that the invention is not restricted to this particular application. Inasmuch as the operation of the instant selective permeation process involves purely physical phenomena rather than chemical reactions, it is widely applicable to the concentration or separation of components of gaseous (i.e., normally gaseous substances and vapors of substances that are liquids or solids at room temperature) mixtures and also components of solutions composed of miscible liquids or solid materials dissolved in solvents. In addition, the fluid mixtures undergoing treatment may contain solid materials suspended as dusts, pollens or undissolved solid particles suspended in slurries or emulsions, and appropriate means should be provided for cleaning the inlet surface of the composite membrane when such solid particles are present in sufficient concentration to block the membrane surface.

For example, the various so-called permanent gases may be segregated from mixtures thereof, as may be illustrated by charging air to a suitable permeation chamber to obtain a gaseous product that is much richer in oxygen or nitrogen; also methane may be separated from admixture with propylene or butane. The process is also suitable for the treating of liquids, as exemplified by the desalination of brackish water by reverse osmosis wherein water passes through the membrane in preference to the dissolved salt and for use in hemodialysis equipment. In addition, normally liquid hydrocarbons or their isomers may be separated by either selective liquid permeation or selective vapor permeation in the gaseous state at elevated temperatures that are below the threshold of thermal degradation of the plasma polymerized material. In many instances, the preferential or favored permeant (i.e., the material passing through the membrane at a fast rate) is the desired product, and sometimes the valuable product is the "rejected" material which is largely retained on the inlet or feed side of the membrane by reason of its slow permeation rate. In general, the instant process is adaptable to at least partially separating two fluid substances which have molecules differing in cross-sectional area by at least about 10 percent or a difference of at least about $0.2(cal./cc.)^{1/2}$ in their solubility parameters or both. When such differences are small, complete separation of the aforesaid two substances is usually not possible in a single stage selective permeation process, but multistage selective permeation may be utilized to concentrate either the favored permeant or the component of the fluid mixture which is mainly rejected by the membrane as described hereinafter. In view of the need for large quantities of hydrogen-rich gases in petroleum refining and petrochemical operations, the present process offers a promising solution for the enrichment of catalytic reformer off-gas by subjecting all or part of the gaseous mixture of hydrogen and lower hydrocarbons to selective permeation to provide a treated effluent of much higher hydrogen content.

The permselective devices employed in the present process comprise a layer or layers of an ultrathin cross-linked plasma-discharge polymerizate maintained in intimate contact with one or more surfaces of a thicker supporting substrate during operations. The polymerizate is characterized by relatively high permselectivity for the desired or chief permeant whereas the substrate displays substantial permeability for that permeant and considerably less or no selectivity. In one preferred embodiment, the polymerizate is firmly bonded to one or more surfaces of a substrate to form a composite laminar membrane; however, in other embodiments, the exit or discharge side of a preformed layer of the polymerizate may be merely mounted on or laid against the surface of the substrate.

The substrate or composite membrane in turn may be mounted on a strong supporting structural member of any desired shape and sufficient porosity to accommodate the expected permeant flow, such as a fine mesh wire screen, a sintered powdered metal plate of suitable contours, a tube of porous ceramic material, etc., to permit operations with a high pressure differential across the membrane and without excessive flow resistance.

Since the base layer or substrate is the backbone or structural member of a composite membrane, it is desirably thick enough to provide adequate mechanical strength. In the case of a resin film substrate, the thickness may range from about 0.3 mil (0.0003 of an inch) to 25 mils or more, and it will be appreciated that both the physical properties and the permeability of the substrate material are important in determining a suitable thickness; also the retention of film strength at elevated temperatures is significant in permeation operations at such temperatures. Typical thicknesses for film substrates are between about 0.5 and 10 mils, and the lower part of this range is particularly preferred, inasmuch as the permeation rate decreases with increasing film thickness.

A plastic film substrate can be fabricated in any conventional method including casting, extrusion, calendering and it may be utilized in the form of a flat film, tube or any appropriate regular or irregular planar or three-dimensional configuration as may be prepared by vacuum forming a thin sheet or film in contoured molds, etc.

For composite laminar membranes, it is generally preferred to employ a resinous substrate or base film of an essentially solid and nonporous character, at least in respect to the surface on which the cross-linked polymerizate is to be deposited and bonded thereto; for the plasma deposition of an uninterrupted or continuous layer of uniform thickness is more easily accomplished in the case of an unbroken, although not necessarily smooth, base surface devoid of pores, voids and pin holes. However, porous substrates, as exemplified by woven and felted fibrous materials and heavy papers, are often suitable for supporting a preformed plasma polymerizate film membrane in selective permeation processes as are sintered powdered metal plates, porous ceramic plates and porous resin films. Also porous materials of the latter types with all pores well below 1 mil in diameter are considered suitable substrates for coating by the plasma deposition technique to produce bonded laminar membranes, since the plasma polymerizate may be expected to bridge across the openings of such fine pores rather than be deposited inside the pores.

A wide variety of resins may be utilized for the substrate material. This selection is governed by a number of factors including substantial permeability for the desired permeant, strength, any necessary heat resistance, resistance to solvent action by any of the fluids being treated and ease of fabrication. Molecules of the gases and liquids do not significantly diffuse through polymer crystallites; therefore a resinous substrate must have at least a substantial content of amorphous polymeric material (e.g., at least about 10 percent) even though it may contain a major proportion of crystalline polymers. In separating hydrogen from admixture with methane, polymers of very high solubility parameter are generally less desirable as substrate material than those with a value of about 11 or less, and nonpolar polymers are preferred over those of the polar variety.

As substrate materials, polyphenylene oxide and the siloxane polymers and copolymers are often preferred as they are noncrystalline materials with flexible backbone polymer chains. Moreover, polyphenylene oxide is a strong resin with a tensile strength of 10,000 p.s.i. and about half of that strength is retained at temperatures of 250° F. With due regard for the characteristics of specific fluid substances to be separated, process conditions and adequate substrate permeability for the desired permeant, many other substrate materials may be employed in separating the components of various fluid mixtures, and these include, inter alia:

Polyvinylidene chloride (SARAN)
Polyvinyl fluoride (TEDLAR)
Polyethylene terephthalate (MYLAR)
Rubber hydrochloride (PLIOFILM)
Polychlorotrifluorethylene (KEL-F)
Polyamide (Nylon)
Poly(styrene-methacrylonitrile)
Polyformaldehyde (acetal) (DELRIN)
Polyvinyl chloride
Poly(styrene-acrylonitrile)
Cellulose acetate
Poly(butadiene-acrylonitrile) (HYCAR)
Polycarbonate
Poly(isobutylene-isoprene) 98/2 (Butyl rubber)
Poly(vinylidene fluoride-hexafluoropropylene) (VITON A)
Polypropylene
Polyurethane (ADIPRENE)
Polydimethylbutadiene (methyl rubber)
Chlorosulfonated polyethylene (HYPALON)

Polychloroprene (NEOPRENE)
Polytetrafluoroethylene (TEFLON)
Poly(butadiene-styrene) (BUNA S)
Polybutadiene
Natural rubber
Ethylcellulose
Polyvinyl alcohol Other substrate resins for various permselective operations are listed in Table I along with permeability data for hydrogen and methane.

TABLE I

| Substrate | Permeability* | |
|---|---|---|
| | $H_2$ | $CH_4$ |
| Polyethylene (low density) | 0.53 | 11 0.15 |
| Polybutene | 0.54 | 0.06 |
| Polyvinyl chloride | 0.75 | 0.15 |
| Fluorinated ethylene-propylene copolymer (Teflon, FEP) | 0.86 | – |
| Cellulose triacetate | 0.87 | – |
| Polystyrene | 1.23 | – |
| Cellulose acetate butyrate | 1.26 | – |
| Polyphenylene oxide | 5.9 | 0.25 |
| Siloxane-carbonate copolymer | 9.2 | 10.5 |
| Polydimethylsiloxane | 19.8 | 26.4 |

*$10^{-7}$ cc.(STP)cm./cm.$^2$-sec.-atm. at 25° C.

The listed materials of low permeability are of relatively little interest for the specific application of separating hydrogen and methane on any substrate scale.

The composite membranes have one or more extremely thin layers of a cross-linked polymerizate which may have a total thickness between about 0.1 and 10 microns. Despite being very thin, these ultrathin laminae are unbroken, nonporous coatings of controlled and relatively uniform thickness which are firmly bonded to the substrate and cover the entire effective surface area thereof without any interruptions in the form of voids or pin holes. Where there is a plurality of the cross-linked deposits, as in the case of a film coated on both sides, the two coatings generally may be expected to have the same effect upon the permeability and selectivity of the composite membrane as a single layer of the same polymerizate having a thickness equal to the sum of the thickness of the two coatings; for separation of the cross-linked polymerizates by the intervening substrate layer does not appear to significantly alter the results obtainable in the present process. Coatings having a total thickness below about 2 microns are generally preferred, especially those in the range of about 0.1 to 0.5 microns.

Ultrathin polymerizate films or coatings having the desired characteristics are obtained by deposition from a plasma glow discharge in the vapor of a monomeric organic compound at low subatmospheric pressure. This discharge in the gaseous or vaporized organic compound at an absolute pressure of only a few millimeters of mercury can be effected by various means including a capacitative high frequency generator, radio frequency or microwave equipment, or direct or alternating currents of voltage (e.g., 115 volts) sufficient to produce luminescence of a relatively uniform nature. A typical electrode spacing for capacitative discharge is between about 0.25 and 2 inches. The treating pressure is desirably in the range of bout 0.1 to 5 torr. (mm. Hg. absolute at 0° C.) and generally below about 1.5 torr. inasmuch as the highest degree of cross-linking in the resulting polymerizate deposit seems to take place in the neighborhood of 0.5 torr.

Any temperature is suitable for the glow discharge treatment as long as it permits maintaining the resinous product and the substrate below their thresholds of thermal degradation, and the substrate may be subjected to either intermittent or continuous cooling during the operation to avoid thermal decomposition. Typical vapor temperatures during deposition are in the range of about 50° to 100° C. To avoid overheating resinous material, the plasma discharge is often actuated intermittently for brief periods of 2 to 30 seconds and the total time of actual deposition may range from about 5 seconds to 1 hour.

The technique of forming polymerized ultrathin films from monomeric organic ompounds of an ionizable nature is described by J. Goodman in J. Polymer Sci., XLIV, 551-2, (1960), by A. Bradley et al., in J. Electrochemical Soc., 110, 15-22 (1963) and in the aforesaid Coleman patents, and these disclosures are incorporated here by reference as suitable for the preparation of the composite membranes in either the batch treatment of stationary substrate films or continuous deposition operations as on films moving across the plasma treating zone. With plasma polymerization and deposition, the polymerizate is deposited upon all surfaces exposed to the luminescent discharge, and this is advantageous for the present purposes in providing flexibility in controlling the application of the coating inasmuch as a substrate film may have both surfaces exposed to the discharge during treatment or one face may be masked in any suitable fashion, such as being placed in contact with an electrode or by treating a substrate in the form of a tubular film which has only its exterior surface exposed.

In any instance where it may be desirable to utilize a selective permeation apparatus consisting of a discrete ultra-thin film of the plasma polymerizate merely supported on but not bonded to the substrate (e.g., a porous powdered metal plate), the polymerizate film may be prepared by plasma discharge deposition of polymerized material onto a temporary base film in the form of a preformed plastic film which is later dissolved in a suitable solvent leaving an unsupported ultrathin film consisting entirely of the cross-linked polymerizate deposited by the plasma discharge as described in Coleman U.S. Pat. No. 3,068,510.

Precursors for the present polymerizate membranes may include but are not limited to conventional monomers with the usual functional groups or linkages suitable for more common methods of polymerization. Any monomeric compound that is subject to excitation or splitting by a plasma glow discharge may be employed. This encompasses such substances as benzene and propane which are not ordinarily considered to be polymerizable. However, it is believed that any ionizable monomeric organic compound can be polymerized by the plasma discharge method which apparently forms ion-radicals and other electronically excited species which deposit and polymerize on any surface exposed to the discharge, as long as the precursor has a vapor pressure of at least about 0.5 mm. at a temperature below a threshold of thermal degradation of the substrate, or below about 200° C. as a generality. It appears that, with the possible exception of perhalogenated compounds, any vaporizable monomeric organic compound containing any type of aliphatic or aromatic unsaturation or containing any carbon-hydrogen bond may be utilized for the purpose.

Aromatic, nitrile or multiunsaturated compounds are preferred as monomers or potential monomers as these tend to produce a higher polymerizate yield than saturated compounds. The polymerizate precursors may be single compounds or mixtures of compounds, and different individual compounds may be sequentially or alternately introduced into the plasma discharge equipment in forming the cross-linked layers.

In addition to the coating precursors listed hereinafter in the enumerated examples, the following substances, inter alia, are suitable for the purpose.

| | |
|---|---|
| Ferrocene | Picoline |
| Phenanthrene | Malononitrile |
| Naphthalene | N,N-dimethyl-p-toluidine |
| Pentamethylbenzene | Aniline |
| Vinyl ferrocene | Dicyanoketene ethylacetal |
| Ethylene dithiocyanate | Cyamelurine |
| Triphenylmethane | Diphenyl mercury |
| Acetylene | N-Nitrosodiphenylamine |
| Cyclopentadiene | Thiourea |
| Hexamethylbenzene | 1-Nitrosopiperidine |
| Methoxynaphthalene | Tetracyano ethylene |
| Quinoline | N-Nitrosodiethylamine |

Styrene
p-Nitrotoluene
p-Xylene
Acrylonitrile
Diphenyl selenide

Thianthrene
Thioacetamide
Thiophene
Benzene selenol

The chemical compositions of the polymerizate films or coatings have not been established, and their ultrathin form renders many analytical techniques inapplicable; however, they generally exhibit a substantial and often a high degree of cross-linking as evidence by their resistance to solvents such as chloroform, their heat resistance and their influence on selective permeation as described herein. Accordingly, they are obviously three-dimensional resins, and their permeabilities are evidence of substantial contents of amorphous polymers. The thickness or depth of the polymerizate layer can be readily controlled by suitably adjusting one or more such factors as the plasma discharge time, pressure, wattage and monomer concentration in an inert carrier gas, such as helium; and the results may be measured by ATR infrared determinations. Also, the degree of cross-linking in such materials may be controlled by adjusting the treating pressure during the plasma discharge with maximum cross-linking usually being obtained at pressures of the order of 0.5 torr. and the degree of cross-linking dropping off at higher pressures.

In addition to providing a process for separating gases that does not require costly refrigeration, the present invention provides numerous benefits and a high degree of flexibility in selective permeation operations. It is relatively rare that a single layer membrane possesses both a reasonably high degree of selectively with good permeability characteristics, and even these are usually suitable for separating only a few specific fluid substances; whereas the plasma polymerizate membranes can provide a tremendous increase in selectivity over the substrate alone with only a minor decrease in throughput. For example, a siloxane-carbonate copolymer film with an initial hydrogen:methane selectivity of 0.87 has been found to exhibit a 55-fold increase in selectivity to 47.2 after deposition of a plasma polymerizate coating with only a 33 percent reduction in hydrogen permeability through the composite coated membrane. This effect is even more striking when it is noted that the plasma polymerizate reversed the selectivity of the film from one slightly favoring methane to one heavily favoring hydrogen permeation. In marked contrast, other methods of membrane modification do not bring about such large changes in selectivity and can result in great losses in permeability. For example, the deposition of stearic acid and stearate soap monolayers on the same substrate material resulted in more than 90 percent decrease in permeability while providing a carbon dioxide-hydrogen selectivity of less than 5. On the other hand, the present polymerizate membranes can provide extremely high selectivity factors which range well above 200 in some instances. Also, the composite membranes may employ a wide variety of substrate materials which were previously useless as semipermeable membranes in at least some separatory operations, for substrate selection for the present process is governed by factors other than selectivity since that is controllable by the plasma polymerizate. Hence, it is possible to select a substrate material on the basis of its heat resistance, solvent resistance, mechanical strength and other factors dictated by the operating conditions for selective permeation so long as the base material has sufficient permeability for the desired permeant. When the plasma glow treatment is properly controlled for a properly chosen substrate, the strength and other physical properties of the substrate are not significantly affected in preparing a composite laminar membrane.

For a better understanding of the nature, objects and benefits of this invention, reference should be had to the following comparative examples or controls as well as the examples demonstrating the present invention which are set forth for the purpose of illustration rather than limiting the invention.

EXAMPLES

The membrane substrates used in the tables of examples hereinafter are films fabricated in conventional manner from known polymers or copolymers, such as a cast film of a siloxane-carbonate copolymer (Gen. Elec. Co. resin XD) derived from dimethyldichlorosilane and 4,4'-dihydroxydiphenylpropane, an extruded low density (0.92) polyethylene film, a cast polyphenylene oxide film and an extruded polydimethylsiloxane film.

To illustrate a suitable method for preparing the selective composite membranes employed in the present invention, a 1.5 mil (0.0015 inch) thick film of the aforesaid siloxane-carbonate copolymer is suspended between two parallel electrodes spaced 1 inch apart in a vacuum chamber and the pressure in the vessel is reduced to about 0.1 torr. (absolute pressure in mm. Hg. at 0° C.) and maintained at that level for 10–15 minutes to expel any gaseous material from the film. After the pressure in the chamber is increased to 1 torr. by admitting benzonitrile, a plasma glow discharge is initiated between the electrodes by means of a capacatative device operating at 100 watts power and 350 KHz. frequency. The discharge is sustained for a period of 5 seconds; then the material is allowed to cool for 5 seconds to avoid over heating the film, and benzonitrile is supplied as necessary to maintain the stated pressure. These alternating deposition and cooling operations are repeated to provide a total treating or deposition time of 1 minute. The product of this treatment has ultrathin cross-linked polymer layers of uniform thickness completely covering and firmly bonded to the exposed areas of both sides of the substrate film. The results obtainable in permeation tests of this particular composite membrane are listed in tabulated Example 1.

For another embodiment of the invention providing the results tabulated as Example 17, the permselective membrane is prepared by subjecting the same film base to 6 plasma glow discharges (100 watts and 350 KHz.) of 5 seconds duration with two different monomer vapors alternately present. In this instance, a plasma discharge of 5 seconds duration in an atmosphere of 1,3,5-trichlorobenzene at 1 torr. pressure is followed by a similar treatment in acrylonitrile vapor after removal of the chlorobenzene compound and cooling of the substrate, and this sequence of operations repeated twice more for a total plasma discharge treating time of 30 seconds.

In still another modification of the plasma polymerizate treatment relating to the permselective membrane utilized in Example 22, a 1.2 mil film of low density polyethylene, is subjected alternately in styrene and in acrylonitrile monomer vapor atmospheres of low pressure to numerous 15-second glow discharges of the aforesaid intensity with adequate cooling intervals therebetween, and the total time of actual polymerizate deposition amounts to 30 minutes.

The tabulated examples of permeation through the various single layer and composite membranes are carried out under essentially the same conditions for purposes of comparison. Undiluted hydrogen and methane of commercial purity are employed separately rather than as mixtures in these permeation runs in order to simplify the procedure and eliminate analytical determinations. Thus, the selected gas, hydrogen or methane, is introduced at 6 p.s.i.g. and 25° C. into a closed vessel which is divided into an inlet chamber and an outlet chamber by means of a membrane facing the inlet chamber and clamped onto a fibrous support and sealed at the edges so that all of the gas passing from the inlet chamber to the outlet chamber must pass through the permeable membrane. The exit chamber is maintained at atmospheric pressure, and the permeation rate is determined by measuring the volume of gas in cc. displaced from the exit chamber over a suitable measured time interval of typically 60 minutes.

In the tables, the results obtainable with controls in the form of uncoated substrate films are designated by the letters A, B, C, and D, and numbered examples illustrating the present invention are indented thereunder by listing the vaporized monomer precursors used in forming the plasma polymerizate coatings on the same films. Unless otherwise stated, all membrane permeabilities were measured at 25° C. and are set forth as the corrected volumes of a specific gas (e.g., $10^{-7}$ cubic centimeters at STP.) passing through the various membranes per second per centimeter of membrane thickness per square centimeter of membrane surface exposed to the incoming undiluted gas per atmosphere of pressure drop across the membrane; the selectivity or permselectivity of a particular membrane is defined here as the ratio of hydrogen permeability to methane permeability; coating treatments in preparing the films are specified by monomer or alternating monomer atmospheres and absolute pressure (torr.) as well as the total time in minutes of the repeated plasma glow discharges, and temperatures are given in degrees centigrade (°C.).

branes than with the composite membranes than with the uncoated control membranes (substrate films) regardless of the chemical composition of the glow discharge polymerizate coating. This is due to the methane permeability being severely restricted by the cross-linked polymerizate coatings in almost all example with the corresponding substantial improvement in selectivity favoring the permeation of hydrogen, and this results in extremely high permselectivity for hydrogen in many instances. Moreover, it is apparent from these data that even less permeation of these composite membranes by ethane and other higher hydrocarbon vapors is to be expected by reason of their having molecules of larger size than that of methane.

It is also noteworthy that the reduction in hydrogen permeability with composite membranes is usually either insignificant or relatively modest, even when extraordinary increases in

TABLE 2

| Ex. | | Plasma treatment | | Permeability [1] | | Selectivity $H_2/CH_4$ moles | Coating thickness |
|---|---|---|---|---|---|---|---|
| | | Min | Tor | $H_2$ | $CH_4$ | | |
| A | Substrate: XD siloxane-carbonate copolymer | | | 9.2 | 10.5 | 0.875 | None. |
| | Coating precursors: | | | | | | |
| 1 | Benzonitrile | 1.0 | 1.0 | 7.26 | 0.222 | 32.7 | Heavy |
| 2 | Cyanogen bromide | 1.0 | 1.0 | 2.74 | 0.075 | 36.6 | Do |
| 3 | Nicotinonitrile | 1.0 | 1.0 | 3.96 | 0.113 | 35.0 | Do. |
| 4 | 3-butenenitrile | 1.0 | 1.0 | 8.87 | 0.39 | 22.8 | Moderate. |
| 5 | Methacrylonitrile | 1.0 | 1.0 | 9.04 | 0.55 | 16.3 | Do |
| 6 | 1,3,5-trichlorobenzene | 1.0 | 1.0 | 8.38 | 0.62 | 13.5 | Heavy |
| 7 | Styrene | 1.0 | 1.0 | 8.46 | 0.68 | 12.4 | Moderate |
| 8 | Naphthalene | 1.0 | 1.0 | 8.1 | 0.44 | 18.4 | Light |
| 9 | Divinylbenzene | 1.0 | 1.0 | 9.85 | 1.33 | 7.4 | |
| 10 | Benzene | 1.0 | 1.0 | 9.57 | 1.33 | 7.2 | Light |
| 11 | Picolene | 1.0 | 1.0 | 10.7 | 1.62 | 6.6 | |
| 12 | Mesitylene | 1.0 | 1.0 | 9.43 | 1.72 | 5.5 | |
| 13 | 1,3-di(trifluoromethyl)benzene | 1.0 | 1.0 | 9.92 | 5.98 | 1.7 | |
| 14 | Acrylic acid | 1.0 | 1.0 | 8.15 | 0.33 | 24.7 | Light. |
| 15 | Allyl bromide | 1.0 | 1.0 | 8.37 | 0.66 | 12.7 | Moderate. |
| 16 | Vinyl acetate | 1.0 | 1.0 | 10.78 | 2.29 | 4.7 | |
| 17 | 1,3,5-trichlorobenzene and acrylonitrile | 0.5 | 1.0 | 6.13 | 0.13 | 47.2 | |

[1] $\times 10^{-7}$ cc. (STP) cm./cm.$^2$-sec.-atm. at 25° C.

TABLE III

| Ex. | | Plasma treatment | | Permeabiltiy* | | Selectivity $H_2/CH_4$ moles |
|---|---|---|---|---|---|---|
| | | Min. | Torr | $H_2$ | $CH_4$ | |
| B | Substrate: Polyethylene (0.92 density) | | | 0.53 | 0.15 | 3.5 |
| | Coating precursors: | | | | | |
| 18 | Acrylonitrile | 0.5 | 1.0 | 0.53 | 0.10 | 5.3 |
| 19 | Styrene | 30 | 1.0 | 0.52 | 0.047 | 11 |
| 20 | Naphthalene | 15 | 1.0 | 0.58 | 0.028 | 20.7 |
| 21 | Hexachlorobutadiene | 7 | 1.0 | 0.59 | 0.10 | 5.9 |
| 22 | Styrene percent acrylonitrile | 30 | 1.0 | 0.54 | 0.007 | 77 |
| 23 | Styrene and hexachlorobutadiene | 15 | 1.0 | 0.60 | 0.068 | 8.8 |
| 24 | Acrylonitrile and divinyl benzene | 5 | 1.0 | 0.55 | 0.026 | 21 |

TABLE IV

| Ex. | | Plasma treatment | | Permeability [1] | | Selectivity $H_2/CH_4$ moles |
|---|---|---|---|---|---|---|
| | | Mln. | Terr. | $H_2$ | $CH_4$ | |
| C | Substrate: Cast polyphenylene oxide | | | 5.97 | 0.31 | 19.2. |
| | Coating precursors: | | | | | |
| 25 | Benzonitrile | 1.0 | 1.0 | 4.47 | 0.066 | 68. |
| 26 | Styrene and cyanogen bromide | 0.5 | 0.5 | 4.28 | 0.032 | 134. |
| 27 | Cyanogen bromide | 0.5 | 0.5 | 3.41 | 0.0114 | 298. |
| 28 | do | 0.5 | 0.5 | 2.59 | 0.0093 | 280 at 0° C. |
| 29 | do | 0.5 | 0.5 | 5.06 | 9.035 | 161 at 45° C. |
| 30 | do | 0.5 | 0.5 | [2]7.32 | [2]0.11 | 68 [2] at 64° C. |

[1] $\times 10^{-7}$ cc. (STP) cm./cm.$^2$-sec.-atm. at 25° C.
[2] In comparison, the permeabilities are 8.53 for hydrogen and 0.55 for methane and the selectivity is 15.5 at 64° C. for the uncoated polyphenylene oxide substrate.

TABLE V

| Ex. | | Plasma treatment | | Permeability [1] | | Selectivity $H_2/CH_4$ moles |
|---|---|---|---|---|---|---|
| | | Mln. | Terr. | $H_2$ | $CH_4$ | |
| D | Substrate: Polydimethylsiloxane | | | 19.8 | 26.4 | 0.7 |
| | Coating precursors: | | | | | |
| 31 | Benzonitrile | 1.0 | 1 | 9.0 | 1.2 | 7.9 |
| 32 | Styrene and acrylonitrile | 10 | 1 | 4.66 | 0.96 | 4.8 |

[1] $\times 10^{-7}$ cc. (STP) cm./cm.$^2$-sec.-atm. at 25° C.

In the foregoing examples, it will be noted that the hydrogen selectivity was greater in every case with the composite membranes. selectivity are obtained. In a few examples there are indications of slightly higher hydrogen permeabilities with coated membranes than with the substrate film alone; however, these improvements are regarded as apparent rather than real and may be attributed to experimental errors or limitations as to reproducibility attendant in such experimentation including variations in the thickness of the particular substrate film employed and possible thermal effects therein resulting from unobserved minor overheating of the material during the plasma discharge treatment.

Examples 27 to 30 provide a study of the effects of permeation temperatures upon the permeabilities of the test gases with the selectivity rising somewhat from 0° to 25° C. and then dropping sharply at temperatures of 45° C. and higher; also the hydrogen permeability increases over the entire range of 0°–64 C. particularly in the upper part of this range. Generally similar but much less pronounced effects occur in similar operations with a control or uncoated polyphenylene oxide over the same temperature range, for the permeabilities of the two gases does not even double and the selectivities remain much more constant with a maximum of less than 25 and a minimum above 15.

Upon subjecting numerous different representative composite membranes of the types listed in Tables II, III and IV to infrared spectroscopy employing the attenuated total reflectance (ATR) technique, the substrate spectrum is found to be visible in all cases and there is evidence of a high degree of cross-linking in the polymeric coating layers. The indications from these data are that all of the composite membranes have a total coating thickness (i.e., the sum of the thickness coatings on the two faces of each film) within the range of about 0.1 to 2.0 micron and usually less than 1.0 micron, even when a heavy coating thickness is listed in certain of the foregoing examples on the basis of visual observation of the color of the membrane.

EXAMPLE 33

To illustrate the preparation of relatively pure hydrogen from a typical petroleum refinery off-gas, an artificial mixture of 65 percent hydrogen and 35 percent methane by volume is prepared and subjected to sequential permeation through two composite membranes like those of Example 1 which provide high selectivity along with an extremely high hydrogen permeability. The charge gas is introduced at 25° C. under a pressure of 5 p.s.i.g. and a rate of 100 moles per hour into a closed vessel where it is directed along one face of a membrane supported on a porous metal plate, and a suction pump is connected to the other end of the closed vessel in order to maintain a subatmospheric pressure of about 50 mm. Hg absolute on the other side of the membrane. After the system is purged and operating at steady state conditions, the gas issuing from the other side of the membrane at a rate of 50 moles per hour is found to contain 94.8 percent hydrogen. Meanwhile, reject gas (i.e., gas which did not pass through the membrane) is being withdrawn from the chamber on the inlet side of the membrane at the same rate of 50 moles per hour with a content of 35.2 percent hydrogen and 64.8 percent of methane.

The initial membrane effluent of high hydrogen content is continuously charged to a second permeation vessel equipped with a second laminar membrane of the same material. The initial permeation effluent is charged to the second vessel at a temperature of 25° C. and pressure of 5 p.s.i.g. at a flow rate of 50 moles per hour by the aforesaid pump, and the second permeation effluent is removed by a similar suction pump at a flow rate of 25 moles per hour as a gas containing 99.6 volume percent of hydrogen after steady state conditions are attained. The reject gas being withdrawn at the same rate from the inlet chamber of the second permeation vessel is found to have a content of 89.4 percent hydrogen and 10.6 percent methane. In view of its high concentration of hydrogen, this second reject gas may optionally be recycled and introduced along with the initial feed into the first permeation vessel in order to improve the efficiency of the process. Thus, hydrogen of more than 99 percent purity may be produced from a gaseous mixture containing more than one-third methane by sequential diffusion through two coated membranes of high selectivity at a hydrogen throughput which is only about 20 percent below that obtainable with uncoated membranes of the same material. It is also noteworthy that permeation of the same charge gas mixture of 65 percent hydrogen and 35 percent methane through two uncoated silicone-carbonate copolymer membranes would have produced a permeation product of lower rather than higher hydrogen content, since the uncoated film favors methane diffusion over hydrogen.

While the present invention has been described in detail in respect to a limited number of membrane substrates and operations in which only hydrogen and methane were charged in order to provide valid comparisons and complete disclosure, it will be readily apparent to those skilled in the art that many variations and modifications are within the purview of this invention, particularly in regard to a great variety of other suitable resin substrates and coating materials as well as other gaseous and liquid mixtures as charge materials. Accordingly, this invention should not be construed as limited in any particulars except as may be set forth in the appended claims or required by the prior art.

We claim:

1. In a process for at least partially separating fluid components from fluid mixtures by selective permeation through a permeable membrane wherein at least one fluid substance diffuses through said membrane at a substantially higher flow rate than one or more other components of said mixtures, the improvement which comprises employing a permselective device comprising a resinous substrate of at least substantial amorphous polymer content, said substrate having at least substantial permeability for said fluid substance and providing supporting contact on at least one substantial surface area of said substrate for an uninterrupted ultrathin layer of a cross-linked plasma-discharge polymerizate of substantially higher selectivity for said permeation than said substrate.

2. A process according to claim 1 in which said cross-linked polymerizate layer is formed by a plasma glow discharge in an atmosphere of at least one vaporized ionizable monomeric organic compound at an absolute pressure between about 0.1 and 5 Torr.

3. A process according to claim 1 in which said device is a composite membrane prepared by the deposition of said cross-linked polymerizate layer onto said substrate by a plurality of plasma glow discharges in a plurality of different atmospheres each containing vapors of different ionizable monomeric organic compounds at subatmospheric pressures.

4. A process according to claim 3 in which said pressures are between about 0.1 and 5 torr.

5. A process according to claim 1 in which the total thickness of said polymerizate is at least about 0.03 micron and the thickness of said substrate is at least about 0.0003 inch.

6. A process according to claim 1 in which said device is a composite membrane prepared by the deposition of said cross-linked polymerizate layer directly onto a nonporous resinous substrate of at least substantial amorphous polymer content by a plasma glow discharge in an atmosphere of a vaporized ionizable monomeric organic compound having a vapor pressure of at least about 0.5 mm. of mercury at a temperature below the threshold of thermal degradation of said resinous substrate.

7. A process according to claim 6 in which the total thickness of said polymerizate is at least about 0.03 micron and the thickness of said substrate is at least about 0.0003 inch.

8. A process according to claim 6 in which the total thickness of said polymerizate is between about 0.03 and 2 microns and the thickness of said substrate is between about 0.0003 and 0.0250 inch.

9. A process according to claim 6 in which the total thickness of said polymerizate is between about 0.1 and 1.0 micron and the thickness of said substrate is between about 0.0005 and 0.0250 inch.

10. A process according to claim 1 in which said process is employed for at least partially separating two fluid substances having at least one of the characteristics of (A) a difference of at least about 10 percent in the cross-sectional areas of the molecules of said substances and (B) a difference of at least about $0.2(cal./cc.)^{1/2}$ in the solubility parameters of said substances.

11. A process according to claim 10 in which two miscible liquid substances in admixture are segregated by the selective permeation of one of said liquid substances through said permselective device.

12. A process according to claim 10 in which two gaseous substances in admixture are segregated by the selective permeation of one of said gaseous substances through said permselective device.

13. A process according to claim 10 in which a mixture containing said two fluid substances is subjected to said selective permeation operation to produce a permeant effluent and a nonpermeant effluent, and at least one of said effluents is thereafter separately subjected to at least one repetition of said selective permeation operation.

14. A process according to claim 1 in which hydrogen is at least partially separated from a mixture thereof with at least one gaseous organic compound.

15. A process according to claim 1 in which hydrogen is at least partially separated from a mixture thereof with at least one gaseous hydrocarbon.

16. A process according to claim 15 in which the hydrogen-rich permeation effluent from said device is thereafter subjected to at least one repetition of said selective permeation operation to produce hydrogen of higher purity.

17. A process according to claim 1 in which hydrogen is at least partially separated from a mixture containing hydrogen and methane.

* * * * *

PO-1050
(5/69)

UNITED STATES PATENT OFFICE
CERTIFICATE OF CORRECTION

Patent No. 3,657,113　　　　　　　　　　　　　Dated　April 18, 1972

Inventor(s)　ARNOLD F. STANCELL and ARTHUR T. SPENCER

It is certified that error appears in the above-identified patent and that said Letters Patent are hereby corrected as shown below:

[73] Assignee: Change "MOBILE" to --MOBIL--

Column 1, line 38, after "919" change "(b1963)" to --(1963)--

Column 5, Table I, under $CH_4$, first line, change "110.15" to --0.15--

Column 8, line 22, change "capacatative" to --capacitative--

Table II, under Plasma Treatment, change "Tor." to --Torr.--

Table III, under Coating Precursors, Example 22, after "Styrene" change "percent" to --&--

Table IV, under Plasma Treatment, change "Mln." to --Min.--
change "Terr." to --Torr.--

Table IV, under $CH_4$, Example 29, change "9.035" to --0.035--

Table V, under Plasma Treatment, change "Terr." to --Torr.--
change "Mln." to --Min.--

Table V, under Selectivity, Example D, change "0.7" to --0.75--

Column 10, line 1, after "the" delete "composite membranes than with the"

Column 10, line 6, change "example" to --examples--

Signed and sealed this 19th day of September 1972.

(SEAL)
Attest:

EDWARD M. FLETCHER, JR.　　　　　　ROBERT GOTTSCHALK
Attesting Officer　　　　　　　　　Commissioner of Patents